Aug. 24, 1954
W. L. DAVIS
2,687,338
SYNCHRONOUS TIME SYSTEM FOR OSCILLOGRAPHS
Filed Sept. 14, 1950
2 Sheets-Sheet 1
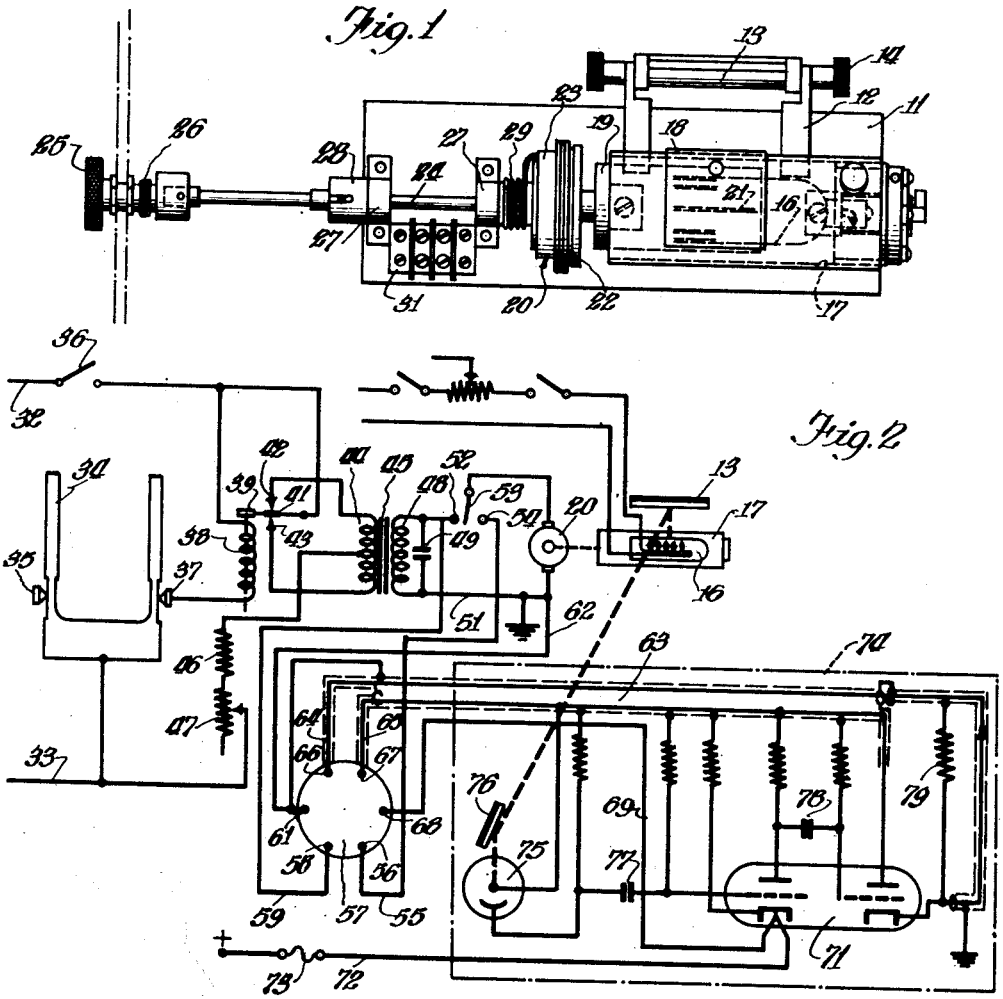
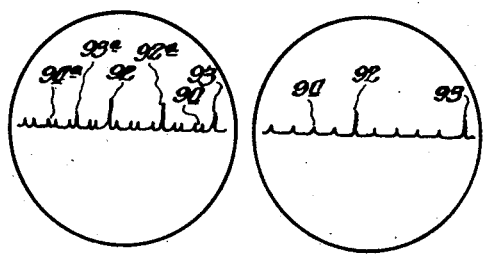
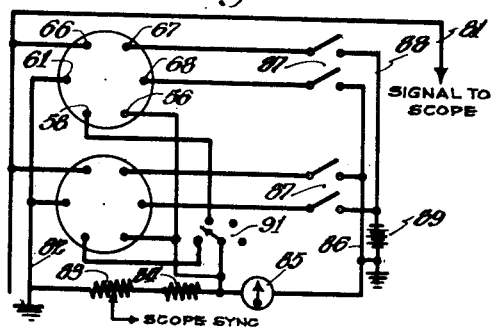
Inventor:
William L. Davis
By: Alvin W. Graf
Attorney

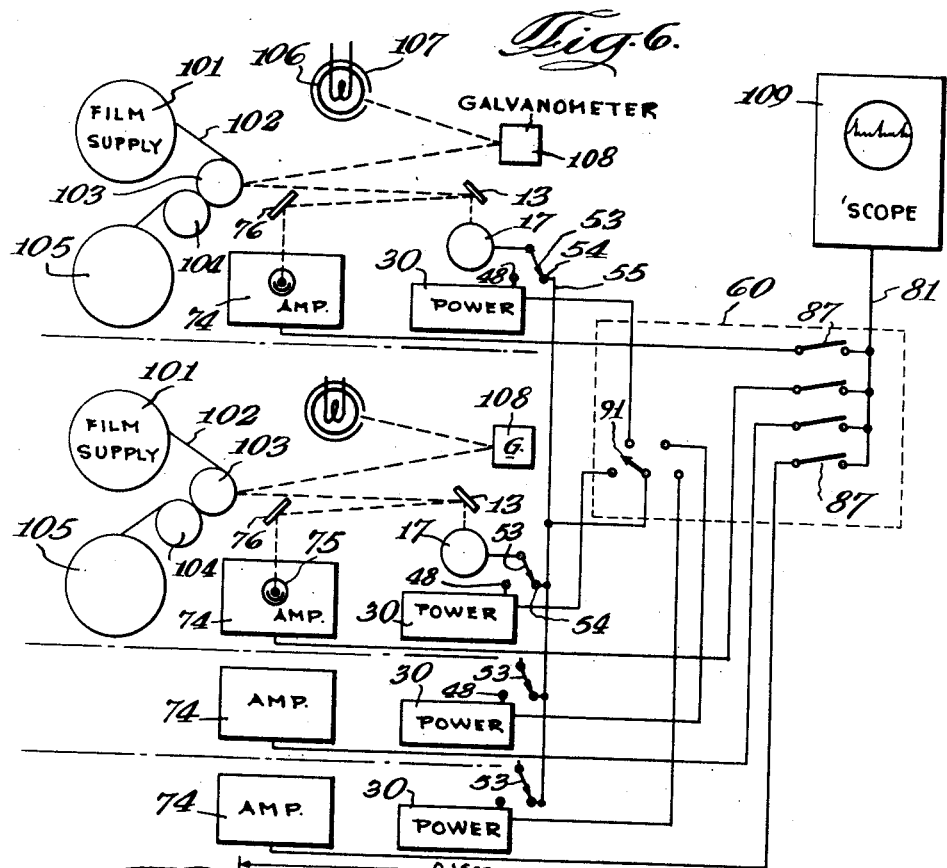
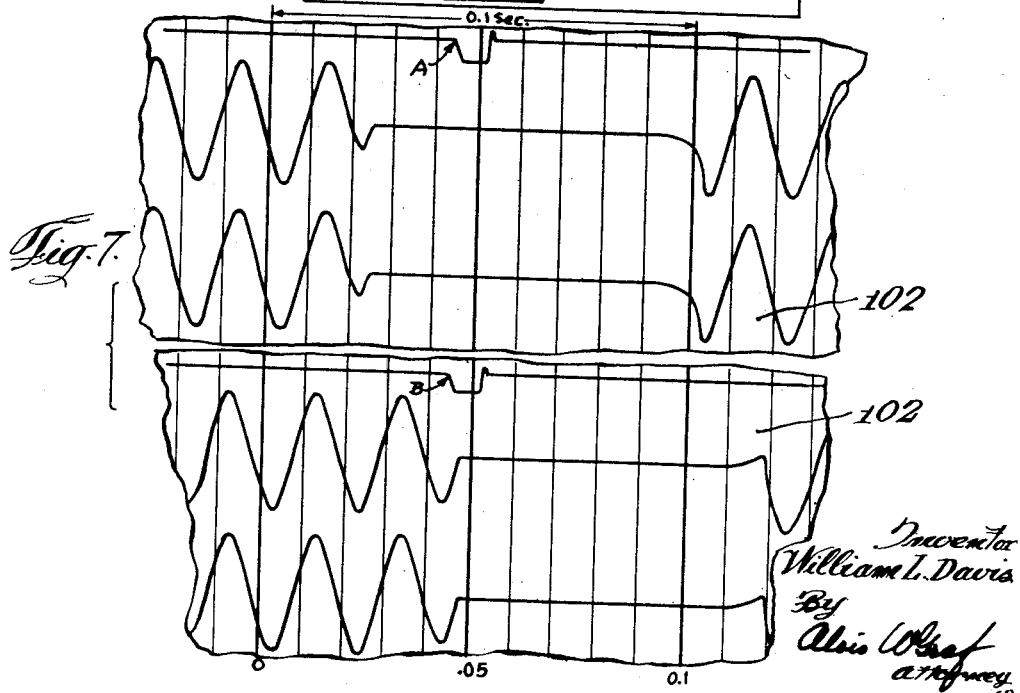

Patented Aug. 24, 1954

2,687,338

UNITED STATES PATENT OFFICE 2,687,338

SYNCHRONOUS TIME SYSTEM FOR OSCILLOGRAPHS

William L. Davis, Denver, Colo., assignor to Hathaway Instrument Company, Denver, Colo., a corporation of Colorado Application September 14, 1950, Serial No. 184,864

5 Claims. (Cl. 346—109)

1

The present invention relates to a synchronous time system for oscillographs whereby synchronous time marking may be obtained in a plurality of oscillographs.

In certain research problems it is frequently desired to obtain a large number of oscillograph records at a single time. While it is not uncommon to have oscillographs with twelve or more elements, it is sometimes necessary to provide simultaneous recording of phenomena which will require the simultaneous use of three or four such oscillographs. Oscillographs are usually provided with some means for indicating on the recording medium, such as paper or film, time intervals. In one type of oscillograph a light source is provided, which is enclosed in a housing having an opening therein. Shutter means are rotated by a synchronous motor, which may be a salient pole or a hysteresis motor. These motors are usually energized from an electrical source generally obtained from a storage battery. The electrical source energized by the storage battery includes a tuning fork and an inverter circuit driven thereby. The tuning fork provides accurate time indications independent of voltage or other variable conditions.

In utilizing a plurality of oscillographs, each provided with their own time indicating devices, it would be desirable to provide a means whereby an indication could be obtained as to whether or not the various marking devices are operating in synchronism. It would also be desirable to provide some means for adjusting the relative phase of the individual time marking mechanisms so that all will produce time markers simultaneously.

Therefore, it is an object of the present invention to provide a synchronous time system for use with a plurality of oscillographs.

A further object of the present invention is to provide means for adjusting the relative phase of timing of individual time markers in a plurality of oscillographs to provide synchronous or simultaneous time indications.

Still another object of the present invention is to provide a system whereby the outputs of the various time markers may be compared so that their relative phase relation may be determined.

Other and further objects of the present invention subsequently will become apparent by reference to the following description taken in conjunction with the accompanying drawing, wherein:

Figure 1 shows a typical mechanism for providing individual light time markers;

Figure 2 is a circuit diagram of the power

2 source ordinarily provided in oscillographs together with a portion of a circuit comprising a portion of the present invention;

Figure 3 is another circuit diagram illustrating the remainder of the present invention;

Figure 4 is a representation of what might be observed on the phase of a cathode ray oscilloscope in comparing the output of two time marker devices, which are not in synchronism;

Figure 5 is another representation of what might be observed on a cathode ray oscilloscope when the time marker devices are flashing simultaneously;

Figure 6 is a block diagram to further facilitate an understanding of the manner of connecting together a plurality of oscillographs; and Figure 7 shows portions of records obtained from the charts in two oscillographs which have been connected together by the circuit arrangement illustrated in Figure 6.

Referring to Figure 1 of the drawing, there is shown a portion of the mechanism contained within an oscillograph. This includes a base 11, which carries a plurality of brackets 12 supporting a pivoted mirror 13, rotatable by means of knobs 14. The mirror 13 receives light from a lamp 16 contained within a housing 17. The housing 17 has an opening therein, the size of which may be regulated by an adjustable cover 18. Within the housing 17 there is located a cylindrical shutter 19 having a plurality of longitudinal slits 21. The cylinder 19, which serves as a shutter, surrounds that portion of the lamp 16 to control the light periodically emitted from the housing 17. The slitted cylinder, or shutter 19, is rotated by the rotor 22 of a synchronous hysteresis motor having an adjustable stator 23. The stator 23 is rotatably mounted so as to be adjusted by a shaft 24 extending to a control knob 25 on the exterior of the cabinet of the oscillograph. Suitable spring biased friction means 26 are provided for retaining the adjusted position of the knob 25 and the shaft 24. The shaft 24 is supported by a plurality of bearing members 27 and adjacent one of these members is a limit stop 28. The limit stop 28 restricts the relative rotation of the shaft 24 to about 330°. This is provided so that flexible conductors 29 may be used between the stator 23 and the terminal board 31.

The synchronous motor comprising the stator 23 and the rotor 22 is driven by periodic current obtained from a suitable source, such as a storage battery connected to electrical conductors 32 and 33 shown in Figure 2. A tuning fork 34 has a microphone button 35 connected to one tine near its base. This microphone button is connected in series with a driving coil for the tuning fork in a manner which is well known to those skilled in the art. This produces oscillation or vibration of the tuning fork as soon as the switch 36 is closed.

Another microphone button 37 is connected to one of the other tines. The microphone button 37 is connected in a circuit between the switch 36 and the conductor 33, which includes a vibrator coil 38 having a reed armature 39. The reed armature 39 carries a movable contact 41, which alternately engages stationary contacts 42 and 43. The movable contact 41 is connected to the switch 36. The stationary contacts 42 and 43 are connected to the center tapped primary winding 44 of a transformer 45. The center tapped winding 44 is connected through a fixed resistor 46 and an adjustable resistor 47 to the conductor 33. The microphone pick-up 37 varies the current flowing through the vibrator coil 38 so that the reed armature 39 will be vibrated at the frequency of the vibrations of the tines of the tuning fork 34. The movable contact 41 alternately completing a circuit through different halves of the primary winding 44 of the transformer 45 induces an alternating voltage into the secondary winding 48. In order to provide a smoother alternating current output, a capacitor 49 is connected across the winding 48.

The secondary winding 48 of the transformer 45 is connected to a conductor 51 which is grounded and to a switch contact 52 having a switch blade 53 and another contact 54. The switch blade 53 is connected to one side of the synchronous motor 20, the other side of which is connected to ground and to the conductor 51.

The switch 53 is provided so that the motor 20 may be energized from the internal power source, which provides periodic current from the transformer 45 when the switch blade 53 is on contact 52. When the switch blade 53 is on contact 54, the motor 20 receives energy from a source external to the oscillograph, as subsequently will become apparent when the circuit in Figure 3 has been described.

The contact 54 of the switch 53 is connected to a conductor 55 connected to a contact 56 of a multiple plug 57. The plug 57 has another contact 58 connected to a conductor 59, which extends to the contact 52, which in turn is connected to the secondary winding 48 of the transformer 45. Another contact 61 of the plug 57 is connected to a grounded conductor 62 and to a shield 63 surrounding conductors 64 and 65 connected respectively to contacts 66 and 67 of the plug 57. Another contact 68 of the plug 57 is connected to a conductor 69 extending to the filament of a double triode vacuum tube 71. The remaining filament terminal of the vacuum tube 71 is connected to a conductor 72, which is suitably provided with a fuse 73, which in turn is connected to the positive terminal of a source of voltage. The vacuum tube 71 forms a part of a photoelectric amplifier 74 indicated by the dotted line rectangle. The photoelectric amplifier includes a photoelectric cell 75, which by means of an auxiliary mirror 76 receives a portion of the light striking the mirror 13 as admitted from the lamp housing 17. The photocell 75 is coupled by a capacitor 77 to the grid of the first triode unit of the vacuum tube 71. The output of this triode unit is coupled by a capacitor 78 to the second triode unit, which is connected in a cathode follower circuit having an output resistor 79 connected to impress a voltage between ground and the conductor 64. Suitable resistors are provided as is customary in a resistance capacitance coupled circuit for the various stages of photoelectric amplifier 74.

Each of the socket connectors 57 is connected to a plug connector such as that shown in Figure 3, wherein for convenience the same reference numerals have been given to the prongs of the male connector as to the socket elements of the connector 57 of Figure 2. It will be noted that the contact 66 extends downwardly to all of the other similar plug units and also to a conductor 81, which is connected to supply signal to a conventional oscilloscope. The contact 61 is connected to a conductor 82, which eventually is grounded and is also connected to a circuit including a voltage divider 83, a resistor 84, a meter 85 and a conductor 86. The conductor 86 extends to one contact of a plurality of double-pole single-throw switches 87, the switch blades of which are connected to the contacts 67 and 68 of the plug unit. The contact 67, which is connected to one of the switch blades of the switch 87 may be connected to a circuit including a conductor 88 leading to a grounded source of potential 89. Each of the contacts 58 of the various plug units is connected to one of the contacts of a selector switch 91, the movable arm of which is connected to one terminal of the resistor 84 and to each of the contacts 56 of the different plug units. By means of the selector switch 91 and proper operation of each of the switches 53, shown in Figure 2, it is possible to select any one of the tuning fork sources of voltage as a source for driving the synchonous motors of all of the oscillographs. The various switches 87 are provided for selectively comparing the time marker outputs of any two oscillographs. Thus, by means of the circuit shown in Figure 2, any primary tuning fork source of voltage may be used to drive the synchronous motors 20 of a plurality of oscillographs. Then to determine whether the flashes of the various lamps 16 are in synchronism, a comparison may be made between any two by closing the proper switches 87 whereupon the oscilloscope will receive pulses, which will produce an image such as that shown in Figure 4, if there is a time difference or phase difference between the marking flashes. Thus, in Figure 4, there is shown the marker impulses generated by two photocell amplifiers 74. The slitted drum or shutter of the time marker device has a plurality of narrow slits and one or more wider slits. For example, a total of ten slits may be provided, one of which is one and a half times wider than the other slits, and still another slit is twice as wide as the narrow slits. The larger slit will produce a pulse resulting in the marker trace 92 and the next larger slit produces a pulse 93 with smaller pulses 94 equally spaced therebetween. The second oscillograph produces pulses 92a, 93a and 94a in a similar manner. The phase displacement is illustrated in Figure 4.

To bring the flashes in synchronism, the rotor of one of the motors 20 is rotated by actuation of the knob 25 of Figure 1. Eventually all pulses will come at the same time so that the image will appear as shown in Figure 5. Thereupon one of the switches 87 may be opened and another one closed so that a third oscillograph may be compared and its marking device adjusted to operate in synchronism with the first two oscillographs. Therefore, it will be appreciated that in accordance with the present invention a relatively simple system provides for synchronous time marking of a plurality of oscillographs where such oscillographs are needed in order to provide a large number of simultaneous responses to the various phenomena to be observed.

To further facilitate an understanding of the operation and the connections involved as heretofore described, reference may be had to Figure 6. Figure 6 is a block diagram wherein certain of the circuit elements shown in Figures 2 and 3 have been indicated and have been given corresponding reference characters. Each oscillograph has a film supply magazine 101 containing film 102 which passes about idler rollers 103 and 104 and then into a record receiving or storage container 105. It is to be understood that the term "film" is used in the broader sense, and would include other photosensitive materials such as paper and the like. A suitable light source 106 is contained within an enclosure 107 so that light may be emitted from a slit therein and directed toward a galvanometer 108 which reflects the light to the recording material 102 as it passes about the roller 103.

The timing marker contained within the housing 17 is shown emitting light to a mirror 13 which strikes another mirror 76 and impinges upon a photocell 75 forming a part of an amplifier 74. The amplifier 74 is shown in detail in Figure 2, and is connected by a suitable conductor to one of the switches 87 contained within the dotted line rectangle 60 which corresponds to the circuit elements shown in Figure 3 of the drawing. The switches 87 are connected by a conductor 81 to a cathode-ray oscilloscope 109.

The motor driving the timing device 17 is connected through a switch 53 to either of two contacts 48 or 54. The contact 54 is connected to a conductor 55 which connects to the switch arm of the switch 91. The contact 48 is connected to a power device 30 which comprises a device corresponding to the left hand portion of Figure 2. The power device 30 is connected to one of the contacts of the switch 91. From the remainder of Figure 6 it will be noted that four oscillographs have been indicated as being connected together, although only the amplifiers and power units of the last two oscillographs have been indicated in the circuit diagram.

Typical curves taken from the recording material or paper 102 of Figure 6 have been illustrated in Figure 7. It will be noted that the zero and one-tenth second lines are heavier than the remaining lines on the recording paper. Synchronization of the two time markers 17 is produced in accordance with the method previously outlined. If, as a further check on this synchronization, additional means are desired, one of the oscillograph traces shown on the top of each of the charts 102 may be used to record the same phenomena. Hence the beginning of such phenomena as shown as A upon the one chart, and as B on the other chart, will serve as a check upon correct synchronization as determined originally by use of the oscilloscope 19. It, of course, will be appreciated that the need of using the traces in the different oscillographs for this purpose is not necessary, but where any doubt is to be resolved one of the oscillograph elements in each oscillograph may be connected to record the same phenomena.

While for the purpose of illustrating and describing the present invention certain preferred embodiments have been illustrated in the drawing, it is to be understood that the invention is not to be limited thereby, since comparable instrumentalities and circuit arrangements are contemplated as may be commensurate with the spirit and scope of the invention set forth in the accompanying claims.

I claim:

1. A system for determining the phase relation between the time interval indications provided for a plurality of oscillographs comprising a plurality of oscillographs each having means for producing periodic electric power, a synchronous motor arranged to be connected to said means, a light source, a cylinder surrounding said source, said cylinder being connected to said motor for rotation, said cylinder having a plurality of equally spaced openings, photoelectric means for receiving a portion of the light passing through said openings, one of said openings being greater than the others, and cathode ray oscilloscope means for comparing the outputs of said photoelectric means.

2. The combination for determining the phase relation between the time interval indications of a plurality of recording oscillographs comprising for each oscillograph a source of light, an enclosure for said light source, a shutter associated with said source of light for periodically emitting light from said enclosure in a greater amount than the remaining times, a synchronous motor connected to said shutter, a source of periodic power for said motor, means for connecting said motor to said source or to an external source, a photoelectric amplifier generating electric pulses in accordance with light emitted from said enclosure; means for receiving power from a selected one of a plurality of sources of power and for energizing a plurality of oscillograph motors therefrom, and cathode ray oscilloscope means for comparing the pulses associated with the greater amounts of light and generated by a plurality of photoelectric amplifiers associated with different oscillographs.

3. The combination for determining the phase between the time interval indications of a plurality of recording oscillographs comprising for each oscillograph a source of light, an apertured cylinder enclosing said light, a shutter for said cylinder connected to a synchronous motor, a tuning fork oscillator source of periodic power, means for connecting said motor to said power source or to an external source, photoelectric means for receiving light from said cylinder and generating electric pulses in accordance therewith; means for receiving power from a selected source of power and for energizing a plurality of oscillograph motors therefrom, and means including an oscilloscope for comparing the pulses generated by a plurality of photoelectric means associated with a plurality of oscillographs.

4. The combination for determining the phase between the time interval indications of a plurality of recording oscillographs comprising for each oscillograph a source of light, an enclosure therefor, a shutter associated with said enclosure for controlling and periodically emitting light in different amounts, a synchronous motor, said shutter being actuated by said motor, a photoelectric amplifier for generating electric pulses in accordance with light emitted from said enclosure; means for energizing a plurality of oscillograph motors from a source of periodic current, and means for comparing the phase relation of the pulses generated by the photoelectric amplifiers of a plurality of oscillographs.

5. In an oscillograph the combination of a synchronous motor, a cylinder connected to said motor, said cylinder being provided with a plurality of equally spaced longitudinal slots, one of said slots being greater in width than the remaining slots, a light source mounted within said cylinder, a slotted enclosure for said first cylinder and said light source, a photoelectric amplifier responsive to light emitted from said enclosure, a source of periodic power for said motor, means for supplying power from said source to another oscillograph, and an oscilloscope for comparing the responses to the greater width slots of a plurality of said photoelectric amplifiers.

References Cited in the file of this patent

UNITED STATES PATENTS

| Number | Name | Date |
| --- | --- | --- |
| 2,166,947 | Fayerweather | July 25, 1939 |
| 2,200,103 | Shutt | May 7, 1940 |
| 2,208,648 | Schrader | July 23, 1940 |
| 2,469,140 | Wahlberg | May 3, 1949 |